US012746621B2

(12) United States Patent
Saito et al.

(10) Patent No.: US 12,746,621 B2
(45) Date of Patent: Sep. 29, 2026

(54) METHOD FOR MACHINING TOOL

(71) Applicant: SINTOKOGIO, LTD., Nagoya (JP)

(72) Inventors: Yuta Saito, Nagoya (JP); Yuji Kobayashi, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 609 days.

(21) Appl. No.: 18/197,759

(22) Filed: May 16, 2023

(65) Prior Publication Data

US 2023/0405723 A1 Dec. 21, 2023

(30) Foreign Application Priority Data

Jun. 15, 2022 (JP) ................................ 2022-096474

(51) Int. Cl.
*B23K 26/356* (2014.01)
*B23K 26/00* (2014.01)
*B23K 26/073* (2006.01)

(52) U.S. Cl.
CPC ........ *B23K 26/356* (2015.10); *B23K 26/0006* (2013.01); *B23K 26/0732* (2013.01)

(58) Field of Classification Search
CPC ............ B23K 26/0006; B23K 26/0732; B23K 26/352; B23K 26/354; B23K 26/356; C21D 10/005
See application file for complete search history.

(56) References Cited

U.S. PATENT DOCUMENTS

2006/0182998 A1 8/2006 Okamura et al.
2020/0102634 A1 4/2020 Polese et al.
2020/0255931 A1 8/2020 Schier et al.
2023/0105814 A1* 4/2023 Kubo ................ B23K 26/0006 407/119
2023/0330779 A1* 10/2023 Kabeya ................ B23K 26/356

FOREIGN PATENT DOCUMENTS

| | | | | |
|---|---|---|---|---|
| JP | 2012223808 | A | * | 11/2012 |
| JP | 2020-525301 | A | | 8/2020 |
| JP | 2020-531300 | A | | 11/2020 |
| JP | 2021-116870 | A | | 8/2021 |
| JP | 2021-122935 | A | | 8/2021 |
| JP | 2021142610 | A | * | 9/2021 |
| WO | 2005/000508 | A1 | | 1/2005 |

OTHER PUBLICATIONS

Machine translation of JP2012223808A; retrieved from ESPACENET on Dec. 12, 2025 (Year: 2025).*
Machine translation of JP2011142610A; retrieved from ESPACENET on Dec. 12, 2025 (Year: 2025).*
Japanese Office Action issued Jan. 20, 2026 in Application No. 2022-096474.

* cited by examiner

*Primary Examiner* — Sang K Kim
(74) *Attorney, Agent, or Firm* — Faegre Drinker Biddle & Reath LLP

(57) ABSTRACT

A method for machining a tool includes applying compressive residual stress to the tool by laser peening using a pulsed laser. The tool includes a base material and a coating layer that covers at least a portion of a surface of the base material. In the applying, the compressive residual stress is applied to the tool such that a difference in compressive residual stress at an interface between the base material and the coating layer is at most 100 MPa.

13 Claims, 6 Drawing Sheets

METHOD FOR MACHINING TOOL

TECHNICAL FIELD

The present disclosure relates to a method for machining a tool.

Priority is claimed on Japanese Patent Application No. 2022-096474, filed Jun. 15, 2022, the content of which is relied upon and incorporated herein by reference in its entirety.

BACKGROUND

Japanese Unexamined Patent Publication No. 2020-525301 describes a method for improving wear resistance of a cemented carbide using laser peening. A tool treated by this method has improved tool life as a result of increased fracture toughness.

SUMMARY

An object of the present disclosure is to provide a method for machining a tool that can further improve tool life.

A method for machining a tool according to an aspect of the present disclosure includes applying compressive residual stress to the tool by laser peening using a pulsed laser. The tool includes a base material and a coating layer configured to cover at least a portion of a surface of the base material. In the applying, the compressive residual stress is applied to the tool such that a difference in compressive residual stress at an interface between the base material and the coating layer is at most 100 MPa.

DETAILED DESCRIPTION

Outline of Embodiment of Present Disclosure

Figure 1:
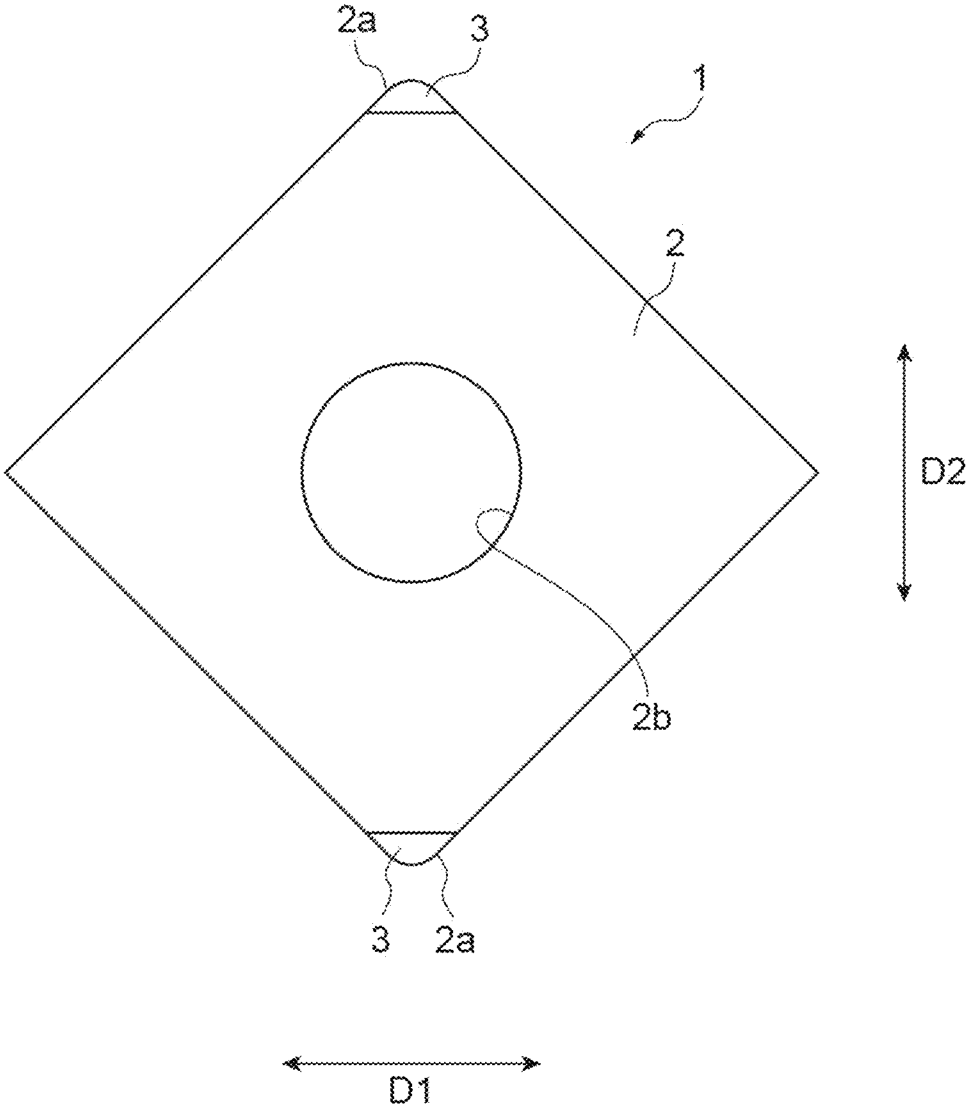
FIG. 1 is a plan view showing an example of a tool prepared in a preparing step.

First, an outline of an embodiment of the present disclosure will be described.

(Clause 1) A method for machining a tool according to an aspect of the present disclosure includes applying compressive residual stress to the tool by laser peening using a pulsed laser. The tool includes a base material and a coating layer that covers at least a portion of a surface of the base material. In the applying, the compressive residual stress is applied to the tool such that a difference in compressive residual stress at an interface between the base material and the coating layer is at most 100 MPa.

In the method for machining a tool, the compressive residual stress is applied to the tool to inhibit the difference in compressive residual stress at the interface between the base material and the coating layer, and thus peeling of the coating layer can be inhibited. Thus, tool life can be further improved.

(Clause 2) In the method for machining a tool according to clause 1, the base material may be made of a sintered body or a carbide having a hardness of at least 4000 HV and at most 8000 HV. The coating layer may be made of a carbide, a nitride, or a carbonitride.

(Clause 3) In the method for machining a tool according to clause 1 or 2, in the applying, by controlling a difference in laser irradiation time between adjacent laser irradiation points, anisotropy may be generated in the compressive residual stress applied to the tool. In this case, anisotropy can be generated in the compressive residual stress applied to the tool. For this reason, for example, if the laser peening is performed such that the compressive residual stress becomes the maximum value in a direction of a feed force or thrust force of cutting resistance when the tool is used for cutting, the tool life can be further improved.

(Clause 4) In the method for machining a tool according to any one of clauses 1 to 3, in the applying, a pulsed laser having a power density of at most 10 $GW/cm^2$ on a surface of the tool may be radiated. In this case, surface damage of the tool is inhibited.

(Clause 5) In the method for machining a tool according to clause 4, in the applying, a pulsed laser having a power density of at least 0.2 $GW/cm^2$ on the surface of the tool may be radiated. In this case, laser ablation can be reliably generated and the compressive residual stress can be applied to the tool.

(Clause 6) In the method for machining a tool according to any one of clauses 1 to 5, in the applying, the tool may be irradiated with a pulsed laser having a pulse width of at least 5 nsec. In this case, laser ablation can be reliably generated and the compressive residual stress can be applied to the tool.

(Clause 7) In the method for machining a tool according to any one of clauses 1 to 6, in the applying, the laser peening may be performed for an entire surface of the coating layer. In this case, if the coating layer is provided on a cutting edge portion that actually performs cutting or the like, chipping resistance of the cutting edge portion can be reliably improved.

(Clause 8) In the method for machining a tool according to any one of clauses 1 to 7, in the applying, the laser peening may be performed such that laser irradiation points are arranged in a square lattice shape. In this case, the laser peening can be performed on an entire laser application region.

Exemplification of Embodiment of Present Disclosure

An embodiment of the present disclosure will be described in detail below with reference to the accompanying drawings. Also, in the description, the same reference signs will be used for the same elements or elements having the same functions, and repeated description thereof will be omitted.

A method for machining a tool according to the embodiment is a method for improving chipping resistance of the tool and further improving tool life by applying compressive residual stress to the tool. Tools serving as machining targets include, for example, cutting tools, stamping tools, and the like. The method for machining a tool according to the embodiment includes a preparing step of preparing a tool and a stress applying step of applying compressive residual stress to the tool.

FIG. 1 is a plan view showing an example of a tool prepared in the preparing step. A tool 1 in this example is a cutting tool. More specifically, the tool 1 is a throw-away tip, which is used while attached to a holder and is configured to be replaceable. The tool 1 is, for example, a lathe insert or a milling insert. The tool 1 includes a base material 2 and a coating layer 3.

The base material 2 is made of a sintered body or a carbide. The base material 2 is made of cBN, WC, ceramics, or carbon steel, for example. A hardness of the base material 2 is at least 4000 HV and at most 8000 HV. The base material 2 has a substantially rhombic shape with a direction D1 serving as a minor axis direction and a direction D2 serving as a major axis direction in a plan view. The base material 2 has a pair of corner portions 2*a* diagonally located in the direction D1. The pair of corner portions 2*a* form cutting edge portions that actually perform cutting or the like. A circular through hole 2*b* is provided at a center of the base material 2. The through hole 2*b* is used at the time of attaching the tool 1 to a holder.

The coating layer 3 covers at least a portion of a surface of the base material 2. In the present embodiment, the coating layer 3 covers surfaces of the pair of corner portions 2*a*. The coating layer 3 is made of a carbide, a nitride or a carbonitride. The coating layer 3 is made of TiAlN, TiN, TiCN, ZrN or DLC, for example. The coating layer 3 has a hardness equal to or greater than that of the base material 2. The coating layer 3 is formed by chemical vapor deposition or physical vapor deposition, for example. A thickness of the coating layer 3 is at least 0.5 μm, for example, 3 μm. The coating layer 3 is provided for the purpose of inhibiting adhesion of a workpiece to the tool 1 and improving wear resistance of the tool 1. The coating layer 3 may be provided on the entire surface of the base material 2, but by providing it only on the pair of corner portions 2*a*, a machining time and a machining cost can be reduced.

Cutting resistance (stress) due to the workpiece is generated in the tool 1 during cutting. In a case in which the tool 1 is a lathe insert or a milling insert, the cutting resistance is divided into three components of a main force, a feed force, and a thrust force, which are orthogonal to each other. The main force is a force that is generated in a direction opposite to a rotating direction of a lathe or milling machine. The feed force is a force generated in a feeding direction of the workpiece with respect to the tool 1. The thrust force is a force generated in a radial direction of the workpiece in the case of a lathe insert and is a force generated in an axial direction of a milling machine in the case of a milling insert.

Magnitudes of the main force, the feed force, and the thrust force vary depending on a material of the workpiece, a cutting speed, a cutting depth, a cutting edge angle, and the like. The main force is usually greater than the feed force and thrust force. In the tool 1 shown in FIG. 1, the main force is generated in a thickness direction of the tool 1, that is, a direction perpendicular to the directions D1 and D2. The feed force is generated in the minor axis direction of the tool 1, that is, in the direction D1. The thrust force is generated in a longitudinal direction of the tool 1, that is, in the direction D2.

The stress applying step is a step of applying compressive residual stress to the tool 1 by laser peening using a pulsed laser. According to the laser peening, the compressive residual stress can be applied to a surface layer 1*a* (see FIG. 2) of the tool 1 without plastically deforming the tool 1. Here, the surface layer 1*a* is a region whose depth from the surface of the tool 1 is, for example, at most 100 μm. A thickness of surface layer 1*a* is greater than the thickness of the coating layer 3.

The stress applying step is performed using shock waves generated by laser ablation. Laser peening is a method of imparting compressive residual stress inside a material, similar to shot peening and burnishing. Shot peening and burnishing involve bringing media or tools into physical contact with a surface of a material, while laser peening does not have such physical contact. In the laser peening, plastic strain can be generated in the tool 1 without changing a crystal state of the tool 1 by using shock waves. Since the plastic strain caused by the shock waves is caused by pressure waves propagating inside the tool 1, deformation and refinement of crystal grains do not occur. For that reason, the shock waves cause only plastic strain inside the crystal grains. Accordingly, the compressive residual stress can be applied without transforming a structure.

The stress applying step is performed while the tool 1 is cooled. Cooling methods include, for example, water cooling and air cooling. Cooling may be performed using a liquid other than water and a gas other than air. The stress applying step is performed, for example, with the tool 1 placed in the liquid. The stress applying step is performed at a normal temperature, for example.

The laser peening is performed for the entire surface of the coating layer 3, for example. As described above, the thickness of the surface layer 1*a* to which the compressive residual stress is applied is greater than the thickness of the coating layer 3. Accordingly, the compressive residual stress is applied not only to the coating layer 3 but also to a surface layer of the base material 2 covered with the coating layer 3. That is, the surface layer 1*a* in this case includes the coating layer 3 and the surface layer of the base material 2.

In the stress applying step, the compressive residual stress is applied to the surface layer 1*a* including the coating layer 3 and the surface layer of the base material 2 without damaging the coating layer 3. In the stress applying step, the compressive residual stress is applied to the tool 1 such that a difference (an absolute value) in compressive residual stress at an interface between the base material 2 and the coating layer 3 is at most 100 MPa, preferably at most 50 MPa, and more preferably at most 10 MPa.

Figure 2:
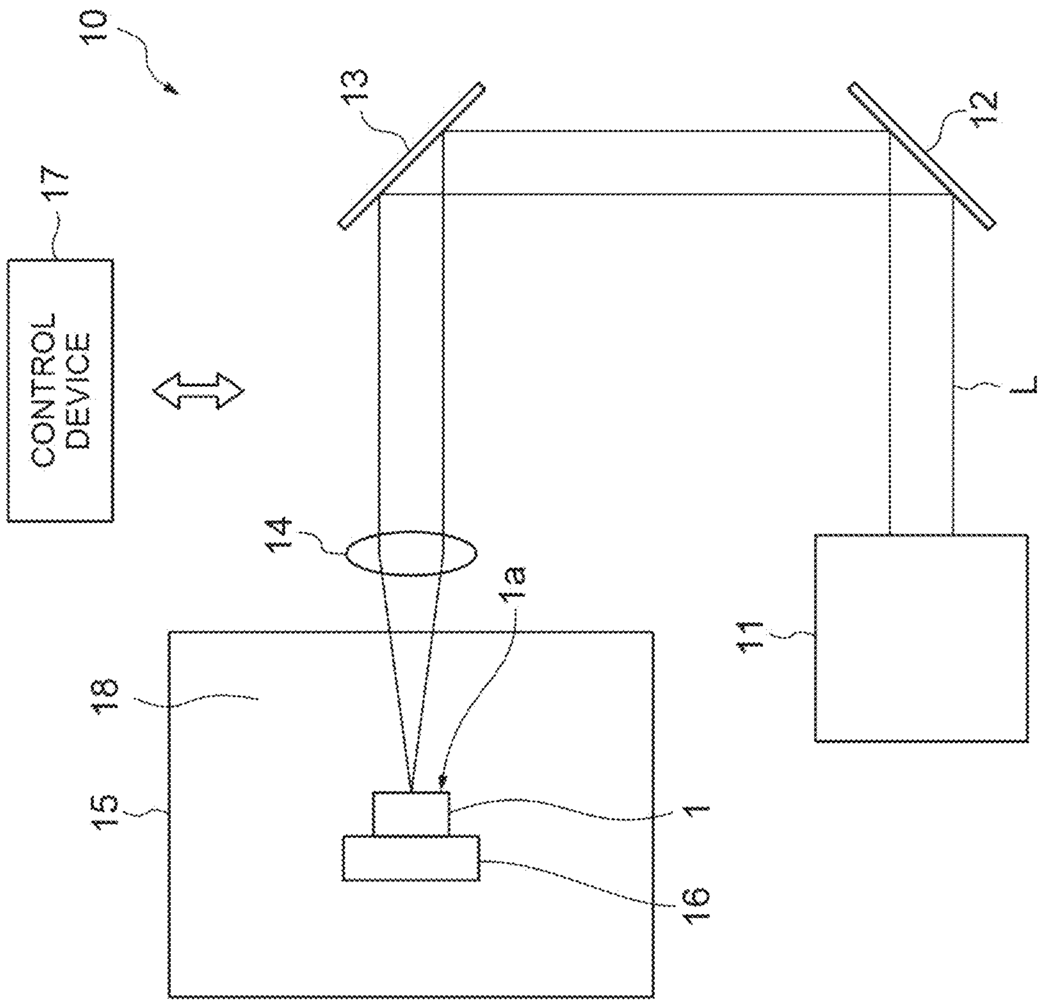
FIG. 2 is a configuration diagram showing a laser irradiation device used in a stress applying step.

FIG. 2 is a configuration diagram showing a laser irradiation device used in the stress applying step. As shown in FIG. 2, the laser irradiation device 10 includes a laser oscillator 11, reflecting mirrors 12 and 13, a condensing lens 14, a water tank 15, a holding portion 16, and a control device 17. The laser oscillator 11 is a device that oscillates laser light L. The reflecting mirrors 12 and 13 transmit the laser light L generated by the laser oscillator 11 to the condensing lens 14. The condensing lens 14 converges the laser light L on a machined position of the tool 1 with high density. The water tank 15 is filled with a transparent liquid 18 such as water. The holding portion 16 holds the tool 1 and disposes the tool 1 in the water tank 15. The holding portion 16 is an actuator or robot.

The laser irradiation device 10 is controlled by the control device 17. The control device 17 is configured as a motion controller such as a programmable logic controller (PLC) or a digital signal processor (DSP). The control device 17 may be configured as a computer system including processors such as a central processing unit (CPU), memories such as a random access memory (RAM) and a read only memory (ROM), input and output devices such as a touch panel, a mouse, a keyboard, and a display, and communication devices such as a network card. The control device 17 operates each hardware under the control of the processors based on computer programs stored in the memories, and thus functions of the control device 17 are realized.

In the case of performing the stress applying step using the laser irradiation device 10, first, the tool 1 is installed on the holding portion 16. Next, the tool 1 is moved into the water tank 15 with the holding portion 16, and the tool 1 is disposed in the liquid 18. Next, the tool 1 is irradiated with the laser light L while the tool 1 is cooled by the liquid 18. The laser light L is a pulsed laser radiated at regular time intervals. A pulse width of the laser light L is at least 5 nsec.

After being oscillated by the laser oscillator 11, the laser light L is transmitted to the condensing lens 14 through an optical system including the reflecting mirrors 12 and 13. The laser light L is condensed with high density by the condensing lens 14 and radiated on the surface of the tool 1 through the liquid 18. A power density of the laser light L is set to at least 0.2 OW/cm$^2$ and at most 10 OW/cm$^2$.

In the tool 1, a peening effect due to the laser peening is produced as follows. First, when the surface of the tool 1 is irradiated with the laser light L, laser ablation occurs on the surface of the tool 1 to generate plasma. If in the atmosphere, the material at an irradiation point vaporizes. Since the irradiation point on the tool 1 is covered with the liquid 18, expansion of the plasma is inhibited. Thus, the plasma has a high pressure, and a shock wave is generated due to the pressure of the plasma. A plastic deformation zone is generated inside the tool 1 due to propagation of the shock wave. In the plastic deformation zone, compressive residual stress is generated due to restraint from undeformed portions. As described above, the plastic deformation due to the shock wave is not plastic working, and thus the crystal grains are neither deformed nor refined. In order to inhibit ablation of the tool 1, the tool 1 may be provided with a sacrificial layer (not shown). The sacrificial layer is, for example, a black PVC tape.

The irradiation of the laser light L corresponds to an operation of the holding portion 16 and is performed while shifting the laser irradiation point on the tool 1. The holding portion 16 moves the tool 1 each time the laser light L is radiated and moves the laser irradiation point on the tool 1.

Figure 3:
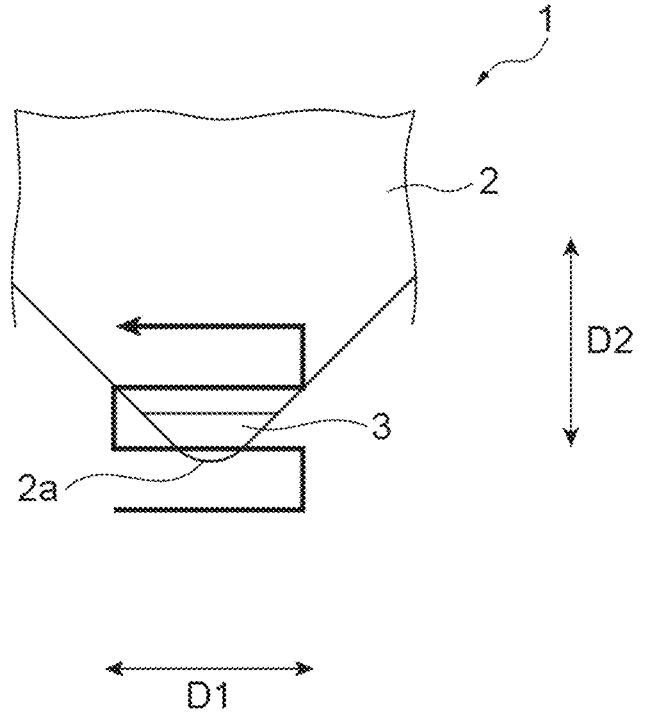
FIG. 3 is a diagram for explaining a direction in which laser peening is performed on the tool.
Figure 4:
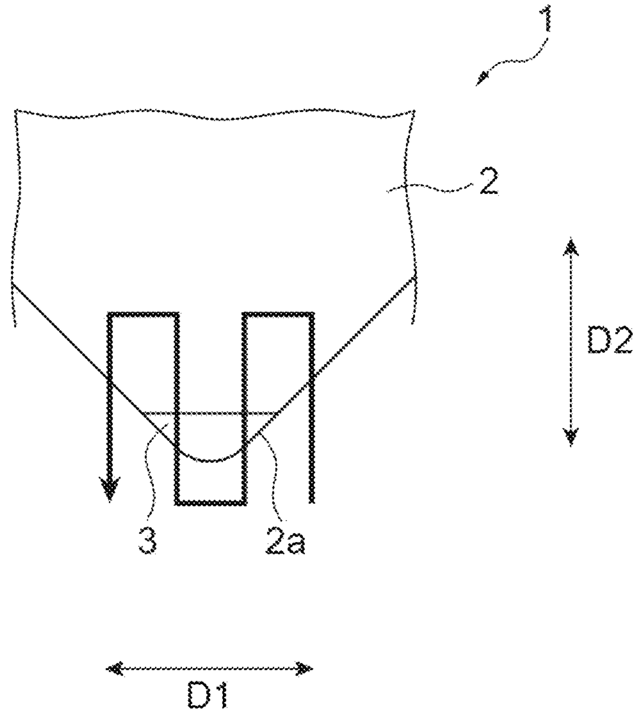
FIG. 4 is a diagram for explaining a direction in which laser peening is performed on the tool.

FIGS. 3 and 4 are diagrams for explaining directions in which laser peening is applied to the tool. In FIGS. 3 and 4, a region in which the laser peening is performed (a laser application region) is shown enlarged. In both FIGS. 3 and 4, the laser peening is performed while the laser irradiation point is moved in a zigzag pattern with respect to the tool 1. In FIGS. 3 and 4, arrows indicating laser peening directions are shown enlarged and protruded to the outside of the coating layer 3, but in reality, the laser application region is set to coincide with a region in which the coating layer 3 is provided.

In FIG. 3, the pulsed laser is radiated while the laser irradiation point is sequentially moved in the direction D1 in the laser application region at each irradiation interval of the pulsed laser, which is a constant time interval. When the laser irradiation point reaches an end of the laser application region in the direction D1, the laser irradiation point is moved once in the direction D2, and the pulsed laser is radiated. After that, irradiation with the pulsed laser is repeated while the laser irradiation point is sequentially moved in the direction D1, reversely to the previous route. That is, the laser peening is performed continuously while the laser irradiation point is scanned in the direction D1, while the laser peening is performed intermittently in the direction D2.

Here, the term "continuously" means that the laser peening is performed at irradiation intervals of the pulsed laser. The term "intermittently" means that the laser peening is not "continuous." Accordingly, if there is a location at which the laser peening is performed at intervals different from the irradiation intervals of the pulsed laser, it is "intermittent."

In the case of FIG. 3, a difference in laser irradiation time between adjacent laser irradiation points in the direction D1 is less than or equal to a difference in laser irradiation time between adjacent laser irradiation points in the direction D2. Except for the laser irradiation points located at ends in the direction D1 within the laser application region, the difference in laser irradiation time between the adjacent laser irradiation points in the direction D1 is shorter than the difference in laser irradiation time between the adjacent laser irradiation points in the direction D2. Anisotropy is imparted to the compressive residual stress due to such a difference in laser irradiation time. The compressive residual stress in the direction D2 becomes greater than the compressive residual stress in the direction D1.

In FIG. 4, the pulsed laser is radiated while the laser irradiation point is sequentially moved in the direction D2 within the laser application region for each irradiation interval of the pulsed laser. When the laser irradiation point reaches an end of the laser application region in the direction D2, the laser irradiation point is moved once in the direction D1, and the pulsed laser is radiated. After that, irradiation with the pulsed laser is repeated while the laser irradiation point is sequentially moved in the direction D2, reversely to the previous routine. That is, in the direction D2, the laser peening is continuously performed while the laser irradiation point is scanned, whereas in the direction D1, the laser peening is intermittently performed.

In the case of FIG. 4, the difference in laser irradiation time between the adjacent laser irradiation points in the direction D2 is less than or equal to the difference in laser irradiation time between the adjacent laser irradiation points in the direction D1. Except for the laser irradiation points located at ends in the direction D2 within the laser application region, the difference in laser irradiation time between the adjacent laser irradiation points in the direction D2 is shorter than the difference in laser irradiation time between the adjacent laser irradiation points in the direction D1. Anisotropy is imparted to the compressive residual stress due to such a difference in laser irradiation time. The compressive residual stress in the direction D1 is greater than the compressive residual stress in the direction D2.

In the stress applying step, it can be said that anisotropy is generated in the compressive residual stress applied to the tool 1 by controlling the difference in laser irradiation time between the adjacent laser irradiation points. In FIGS. 3 and 4, for example, the laser peening is performed such that the laser irradiation points are arranged in a square lattice. That is, distances between the adjacent laser irradiation points in the direction D1 are equal to distances between the adjacent laser irradiation points in the direction D2.

According to the applying direction in FIG. 3, a stronger compressive residual stress is applied in a thrust force direction (the direction D2) than in a feed force direction (the direction D1) of the cutting resistance. According to the applying direction in FIG. 4, a stronger compressive residual stress is applied in the feed force direction of the cutting resistance (direction D1) than in the thrust force direction of the cutting resistance (direction D2). Accordingly, by selecting a laser peening direction in accordance with usage conditions of the tool 1, life of the tool 1 can be further improved. For example, for the usage conditions in which the thrust force is greater than the feed force, the applying direction shown in FIG. 3 is selected, and for the usage conditions in which the feed force is greater than the thrust force, the applying direction shown in FIG. 4 is selected. Thus, the tool 1 can be effectively strengthened. The compressive residual stress introduced into the tool 1 is difficult to be released in the thickness direction of the tool 1 but is easily released in an in-plane direction of the tool 1. Also from this viewpoint, it is important to apply to the tool 1 the compressive residual stress having anisotropy in the feed force direction and the thrust force direction of the cutting resistance.

As described above, in the method for machining a tool according to the embodiment, in the stress applying step, the compressive residual stress is applied to the tool 1 such that the difference in compressive residual stress at the interface between the base material 2 and the coating layer 3 is at most 100 MPa, so that peeling of the coating layer 3 can be inhibit. Thus, life of the tool 1 can be further improved.

The base material 2 is made of a sintered body or a carbide having a hardness of at least 4000 HV and at most 8000 HV. The coating layer 3 is made of a carbide, a nitride, or a carbonitride and covers the pair of corner portions 2*a* that form the cutting edge portions of the base material 2. In this way, the base material 2 is made of a hard material and the cutting edge portions are covered with the coating layer 3, and thus life of the tool 1 can be further improved.

In the method for machining a tool according to the embodiment, by controlling the difference in laser irradiation time between the adjacent laser irradiation points, anisotropy can be generated in the compressive residual stress applied to the tool 1. For example, when the tool 1 is used for cutting, the laser peening is performed such that the compressive residual stress becomes the maximum value in a main force direction of the cutting resistance. Thus, life of the tool 1 can be further improved.

In the stress applying step, a pulsed laser having a power density of at least 0.2 $GW/cm^2$ and at most 10 $GW/cm^2$ on the surface of the tool 1 is radiated. By being at most 10 $GW/cm^2$, surface damage of the tool 1 is inhibited. By being at least 0.2 $GW/cm^2$, laser ablation can be reliably generated and the compressive residual stress can be imparted.

The pulse width of the pulsed laser used in the stress applying step is at least 5 nsec. Accordingly, laser ablation can be reliably generated and the compressive residual stress can be applied to the tool 1.

In the stress applying step, the laser peening is applied to the entire surface of the coating layer 3 provided on the cutting edge portions of the base material 2, and thus chipping resistance of the cutting edge portion can be reliably improved.

In the stress applying step, the laser peening is performed such that the laser irradiation points are arranged in a square lattice, and thus the laser peening can be performed on the entire laser application region.

The present disclosure is not necessarily limited to the above-described embodiment, and various modifications are possible without departing from the gist thereof.

Experimental examples will be described below.

Experimental Examples 1 to 4

First, a TiAlN coating was applied to a cBN cutting tip to prepare tools including a cBN base material and a TiAlN coating layer. Next, in order to inhibit abrasion of the base material and the coating layer, a black PVC tape serving as a sacrificial layer was applied on the coating layer. Subsequently, laser peening was performed from above the sacrificial layer under the conditions shown in Table 1 to obtain tools according to Experimental Examples 1 to 4. Applying directions of Experimental Examples 1 and 3 correspond to the applying direction shown in FIG. 3 (continuous to the direction D1), and applying directions of Experimental Examples 2 and 4 correspond to the applying direction (continuous to the direction D2) shown in FIG. 4.

TABLE 1

| | Pulse energy (mJ) | Spot diameter (mm) | Power density ($GW/cm^2$) | Coverage (%) | Applying direction |
|---|---|---|---|---|---|
| Experimental Example 1 | 37 | 0.5 | 3 | 1000 | Continuous to direction D1 |
| Experimental Example 2 | | | | | Continuous to direction D2 |
| Experimental Example 3 | 74 | | 6 | | Continuous to direction D1 |
| Experimental Example 4 | | | | | Continuous to direction D2 |

Experimental Example 5

An uncoated tool was prepared without applying a TiAlN coating to a cBN cutting tip. Next, a black PVC tape was attached as a sacrificial layer directly onto the base material, laser peening was then performed under the same conditions of pulse energy, a spot diameter, a power density, a coverage, and an applying direction as in Experimental Example 1, and thus a tool according to Example 5 was obtained.

Experimental Example 6

A tool of Experimental Example 6 was prepared as a Non-LP product without laser peening. The tool of Experimental Example 6 includes the same base material made of cBN as the tool of Experimental Example 1 and a coating layer made of TiAlN.

(Cutting)

Using the tools of Experimental Examples 1 to 6, cutting was performed for a S55C (a carbon steel specified by JIS G4051) material on a lathe for 300 seconds. Cutting edge portions of each tool after cutting were observed. In the tools of Experimental Examples 1 to 3 and 6, peeling of the coating layer occurred. In the tool of Experimental Example 4, peeling of the coating layer did not occur. Since the tool of Experimental Example 5 was uncoated, peeling of the coating layer was not a problem, but cemented carbide adhesion occurred on the cBN base material.

Figure 5:
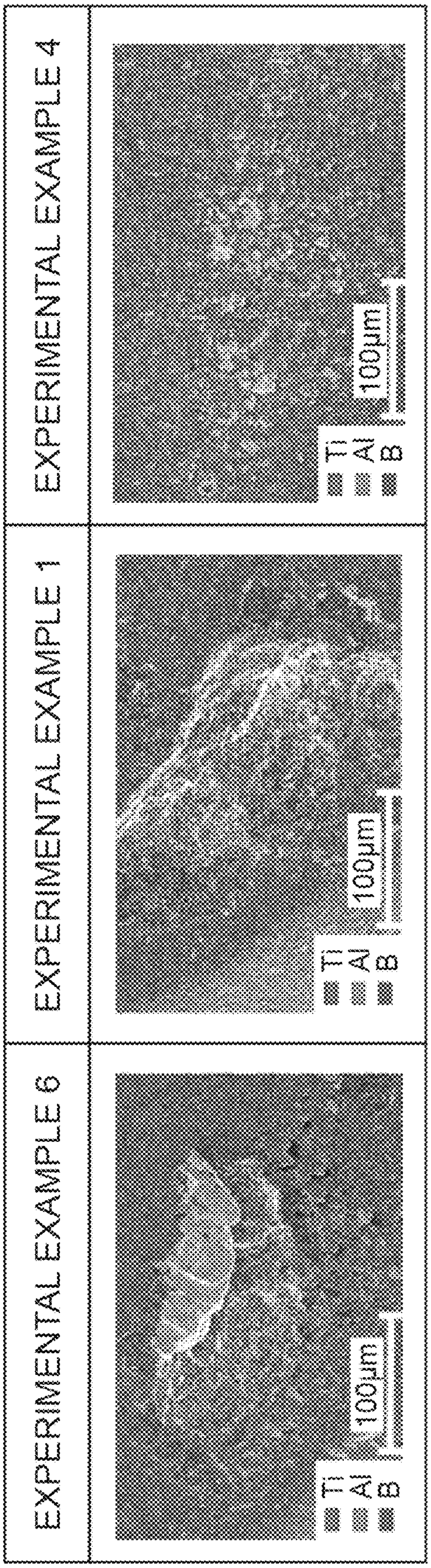
FIG. 5 is a diagram showing EDS elemental mapping images of tools after cutting.

FIG. 5 is a diagram showing energy dispersive X-ray spectroscopy (EDS) elemental mapping images of the tools after cutting. In FIG. 5, EDS elemental mapping images are shown as observation results of the tools of Experimental Examples 1, 4, and 6. In the tools of Experimental Examples 1 and 6, it was confirmed that there were some parts in which amounts of Ti element and Al element contained in the coating layer decreased due to the peeling, and B element contained in the base material was detected. In the tool of Experimental Example 4, it was confirmed that there was little unevenness of the elements and no peeling occurred.

Figure 6:
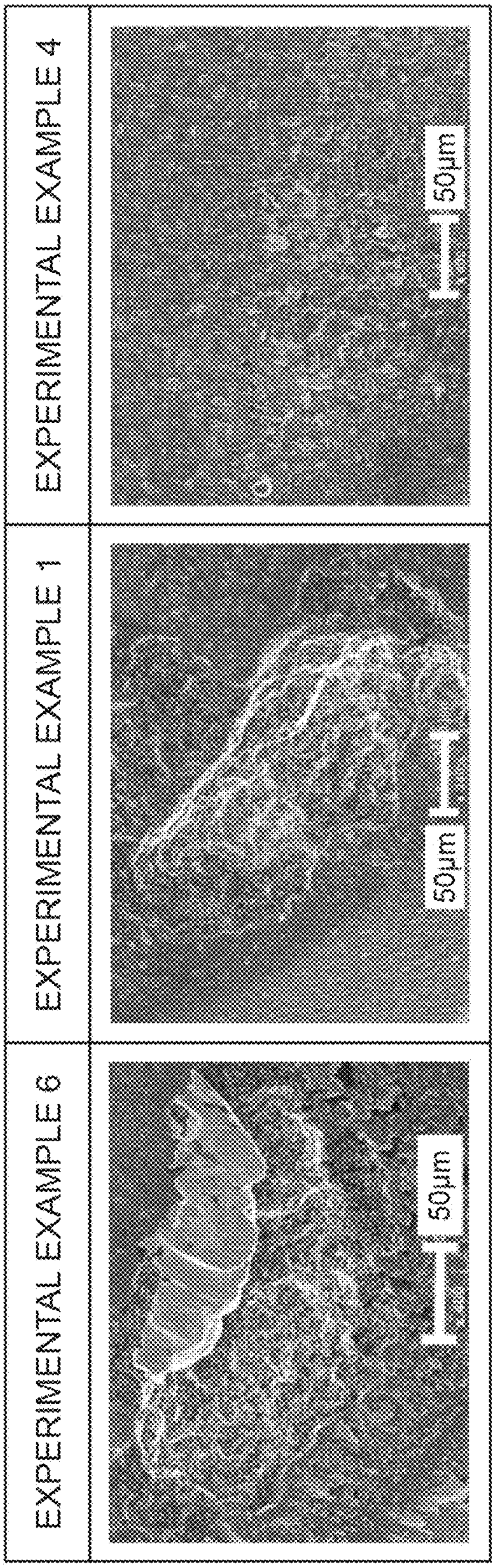
FIG. 6 is a diagram showing SEM images of the tools after cutting.

FIG. 6 is a diagram showing SEM images of the tools after cutting. In FIG. 6, the SEM images are shown as observation results of the tools of Experimental Examples 1, 4, and 6. From the SEM images, it was confirmed that the coating layers of the tools of Experimental Examples 1 and 6 were peeled off. In the tool of Experimental Example 4, it was confirmed that the coating layer was not peeled off.

(Residual Stress Measurement)

For the tools of Experimental Examples 1 and 2, residual stress was measured before and after the laser peening. An X-ray diffractometer manufactured by Rigaku Corporation was used for the measurement. Table 2 shows measurement conditions, and Table 3 shows measurement results at an interface between the cBN base material and the TiAlN layer. Since X-ray diffraction is used for the residual stress measurement, X-ray diffraction peaks are overlapped. For that reason, residual stress values of the cBN base material and the TiAlN layer were calculated from the measurement conditions and phase fractions shown in Table 2.

TABLE 2

| | cBN | TiAlN |
|---|---|---|
| Tube bulb | Cu/Kα | |
| Voltage (kV) | 45 | |
| Current (mA) | 200 | |
| Measurement method | Inclination method | |
| Measurement surface | (331) | (420) |
| Young's modulus | 712 | 477 |
| Poisson's ratio | 0.28 | 0.25 |

TABLE 3

| | | | Experimental Example 1 | | Experimental Example 2 | |
|---|---|---|---|---|---|---|
| X-ray incidence direction | | | D1 | D2 | D1 | D2 |
| Residual stress | cBN | Before applying (MPa) | −65 | 52 | −56 | 53 |
| | | After applying (MPa) | −178 | 18 | −91 | −109 |
| | TiAlN | Before applying (MPa) | −167 | 28 | −72 | −31 |
| | | After applying (MPa) | −186 | −87 | −74 | −62 |

As calculated from the results in Table 3, in Experimental Example 1, an amount of change in the residual stress of the cBN base material was −113 MPa when an X-ray incidence direction was the direction D1, and −34 MPa when the X-ray incidence direction was the direction D2. In Experimental Example 2, the amount of change in the residual stress of the cBN base material is −35 MPa when the X-ray incidence direction is the direction D1, and −162 MPa when the X-ray incidence direction is the direction D2. As shown in Table 1, in Experimental Example 1, laser peening was performed continuously in the direction D1. In Experimental Example 2, laser peening is performed continuously in the direction D2. That is, it was confirmed that, the amount of change in the residual stress in a case in which the X-ray incidence direction coincided with the laser peening direction was greater than in a case in which these directions did not coincide with each other.

What is claimed is:

1. A method for machining a tool, the method comprising applying compressive residual stress to the tool by laser peening using a pulsed laser, wherein the tool includes a base material and a coating layer that covers at least a portion of a surface of the base material, in the applying, the compressive residual stress is applied to the tool such that a difference in compressive residual stress at an interface between the base material and the coating layer is at most 100 MPa, and in the applying, the tool is irradiated with a pulsed laser having a pulse width of at least 5 nsec.

2. The method for machining a tool according to claim 1, wherein the base material is made of a sintered body or a carbide having a hardness of at least 4000 HV and at most 8000 HV, and the coating layer is made of a carbide, a nitride, or a carbonitride.

3. The method for machining a tool according to claim 1, wherein, in the applying, by controlling a difference in laser irradiation time between adjacent laser irradiation points, anisotropy is generated in the compressive residual stress applied to the tool.

4. The method for machining a tool according to claim 1, wherein, in the applying, a pulsed laser having a power density of at most 10 $GW/cm^2$ on a surface of the tool is radiated.

5. The method for machining a tool according to claim 4, wherein, in the applying, a pulsed laser having a power density of at least 0.2 $GW/cm^2$ on the surface of the tool is radiated.

6. The method for machining a tool according to claim 1, wherein, in the applying, the laser peening is performed for an entire surface of the coating layer.

7. The method for machining a tool according to claim 1, wherein, in the applying, the laser peening is performed such that laser irradiation points are arranged in a square lattice shape.

8. A method for machining a tool, the method comprising applying compressive residual stress to the tool by laser peening using a pulsed laser, wherein the tool includes a base material and a coating layer that covers at least a portion of a surface of the base material, in the applying, the compressive residual stress is applied to the tool such that a difference in compressive residual stress at an interface between the base material and the coating layer is at most 100 MPa, in the applying, a pulsed laser having a power density of at most 10 $GW/cm^2$ on a surface of the tool is radiated.

9. The method for machining a tool according to claim 8, wherein the base material is made of a sintered body or a carbide having a hardness of at least 4000 HV and at most 8000 HV, and the coating layer is made of a carbide, a nitride, or a carbonitride.

10. The method for machining a tool according to claim 8, wherein, in the applying, by controlling a difference in laser irradiation time between adjacent laser irradiation points, anisotropy is generated in the compressive residual stress applied to the tool.

11. The method for machining a tool according to claim 8, wherein, in the applying, a pulsed laser having a power density of at least 0.2 $GW/cm^2$ on the surface of the tool is radiated.

12. The method for machining a tool according to claim 8, wherein, in the applying, the laser peening is performed for an entire surface of the coating layer.

13. The method for machining a tool according to claim 8, wherein, in the applying, the laser peening is performed such that laser irradiation points are arranged in a square lattice shape.

* * * * *